United States Patent
Madron et al.

(10) Patent No.: US 11,098,756 B2
(45) Date of Patent: Aug. 24, 2021

(54) WHEEL BEARING ARRANGEMENT HAVING A COATING

(71) Applicant: Schaeffler Technologies AG & Co. KG, Herzogenaurach (DE)

(72) Inventors: Milan Madron, Nuremberg (DE); Yashar Musayev, Nuremberg (DE); Jürgen Hessler, Röthlein (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/632,746

(22) PCT Filed: Jul. 3, 2018

(86) PCT No.: PCT/DE2018/100605
§ 371 (c)(1),
(2) Date: Jan. 21, 2020

(87) PCT Pub. No.: WO2019/015712
PCT Pub. Date: Jan. 24, 2019

(65) Prior Publication Data
US 2020/0158165 A1 May 21, 2020

(30) Foreign Application Priority Data
Jul. 21, 2017 (DE) .................... 10 2017 116 514.2

(51) Int. Cl.
*F16C 19/18* (2006.01)
*B60B 27/00* (2006.01)
(Continued)

(52) U.S. Cl.
CPC .......... *F16C 19/18* (2013.01); *B60B 27/0005* (2013.01); *F16C 33/581* (2013.01);
(Continued)

(58) Field of Classification Search
CPC .. C23C 4/00; C23C 4/06; C23C 4/123; C23C 24/08; C23C 24/082; C23C 24/085;
(Continued)

(56) References Cited

U.S. PATENT DOCUMENTS

2004/0206266 A1* 10/2004 Maze .................... C23C 28/321
106/1.17
2013/0066517 A1* 3/2013 Nishikawa .............. G01L 25/00
701/34.4
(Continued)

FOREIGN PATENT DOCUMENTS

DE 102006006910 B3 5/2007
DE 102006042632 A1 3/2008
(Continued)

OTHER PUBLICATIONS www.whatsinproducts.com_Titanium near tetrabutanolate (Year: 2020).*

*Primary Examiner* — Phillip A Johnson
(74) *Attorney, Agent, or Firm* — Antun M. Peakovic

(57) ABSTRACT

A wheel bearing arrangement for a motor vehicle includes a wheel hub. The wheel hub is connected to a wheel flange. A multi-row rolling element bearing is mounted on the wheel hub. The bearing has an outer ring and at least one inner ring which is axially prestressed by a collar of the wheel hub. A zinc flake coating is formed on at least part of the wheel bearing arrangement to improve corrosion protection.

7 Claims, 2 Drawing Sheets

(51) Int. Cl.
    *F16C 33/58*  (2006.01)
    *F16C 33/64*  (2006.01)
(52) U.S. Cl.
    CPC .......... *F16C 33/64* (2013.01); *F16C 2204/50* (2013.01); *F16C 2223/42* (2013.01); *F16C 2240/60* (2013.01); *F16C 2300/42* (2013.01); *F16C 2326/02* (2013.01)
(58) Field of Classification Search
    CPC ..... C23C 24/087; C23C 24/10; C23C 24/103; C23C 24/106; F16C 19/186; F16C 19/386; F16C 2326/02
    See application file for complete search history.

(56) References Cited

U.S. PATENT DOCUMENTS

2015/0115696 A1\* 4/2015 Baratti ................ B60B 27/0094
                                                    301/109
2017/0219013 A1\* 8/2017 Yokota .................. F16C 19/186

FOREIGN PATENT DOCUMENTS

| DE | 102008055716 A1 | 5/2010 |
| DE | 102015216657 A1 | 3/2017 |
| DE | 102015119171 A1 | 5/2017 |
| JP | 2005054910 A | 3/2005 |
| WO | 2006007985 A1 | 1/2006 |
| WO | 2008145163 A1 | 12/2008 |
| WO | 2011012434 A1 | 2/2011 |

\* cited by examiner

WHEEL BEARING ARRANGEMENT HAVING A COATING

CROSS-REFERENCE TO RELATED APPLICATIONS

This application is the U.S. National Phase of PCT Appln. No. PCT/DE2018/100605 filed Jul. 3, 2018, which claims priority to DE 10 2017 116 514.2 filed Jul. 21, 2017, the entire disclosures of which are incorporated by reference herein.

TECHNICAL FIELD

The disclosure relates to a wheel bearing arrangement for a motor vehicle, comprising a wheel hub, wherein the wheel hub is connected to a wheel flange, wherein a multi-row anti-friction bearing having an outer ring and at least one separate bearing inner ring arranged axially on the outside is mounted on the wheel hub, and wherein at least partially a surface coating for improving corrosion protection is formed on the wheel bearing arrangement. The disclosure furthermore relates to a motor vehicle with such a wheel bearing arrangement as well as in particular a method for coating a wheel bearing arrangement.

BACKGROUND

DE 10 2015 216 657 A1 discloses a method for producing a metallic bearing component, such as, for example, a wheel bearing, in the case of which an outer surface, to be protected from corrosion, of the metallic bearing component is oriented into the active region of a cold-spray unit, wherein a coating for corrosion protection is applied with a low pressure cold-spray method onto the outer surface, to be protected, of the metallic bearing component.

SUMMARY

The object of the disclosure lies in further developing a wheel bearing arrangement for a motor vehicle and in particular improving the resistance of the wheel bearing arrangement to corrosion.

A wheel bearing arrangement comprises a wheel hub, wherein the wheel hub is connected to a wheel flange, wherein a multi-row anti-friction bearing having an outer ring and at least one separate bearing inner ring arranged axially on the outside is mounted on the wheel hub, which bearing inner ring is axially pretensioned by a collar, which acts on an end surface of the inner ring, of the wheel hub, wherein at least partially a surface coating for improving corrosion protection is formed on the wheel bearing arrangement, and wherein the surface coating is formed as a zinc flake coating.

In other words, a surface coating is formed fully or at least partially on the wheel bearing arrangement. The surface coating is thus formed at least on a part of the surface of the wheel bearing arrangement. In this case, an internal toothing geometry of the wheel bearing arrangement, which comes into toothed engagement, for example, with a shaft element or an axle of the motor vehicle, is preferably not provided with a surface coating. It is, however, furthermore also conceivable that the surface coating is formed on the entire surface of the wheel bearing arrangement.

In other words, the surface coating is substantially a non-electrolytically applied coating and primarily comprises zinc flakes, wherein aluminum flakes can also be formed in the surface coating. The zinc flake coating comprises substantially zinc content, in particular zinc and aluminum content. The coating composition used to form the coating preferably comprises zinc powder, aluminum powder, titanium tetrabutanolate and further constituents.

One possible coating composition comprises, for example, 50-60% zinc powder, 5-10% aluminum powder, 5-10% titanium tetrabutanolate, 10-20% butyl titanate monomer and hydrocarbons. A further possible coating composition comprises, for example, 30-50% zinc powder, 2.5-5% aluminum powder, 30-50% titanium tetrabutanolate, 2.5-5% trimethoxyvinyl silane and hydrocarbons.

In particular the zinc flake coating generates cathodic protection of the surface of the wheel bearing arrangement and is characterized, in contrast to electrolytically galvanized surfaces and galvanically applied zinc layers, by high corrosion protection and good chemical resistance. The inward diffusion, for example, of hydrogen into the surface of the wheel bearing arrangement is furthermore at least reduced or prevented by a barrier action of the surface coating.

According to one embodiment, the surface coating is formed in a functionally relevant manner on the outer surface of the wheel bearing arrangement. A deliberately partial coating of the wheel bearing arrangement can be enabled by a masking or covering of the surfaces, which are not to be coated, on the wheel bearing arrangement, for example, an internal toothing. The outer, i.e. the visible surfaces of the wheel hub thus have a surface coating. The surface coating of wheel bearing is particularly advantageous since sticking of a wheel fastened to the axle of the motor vehicle as a result of corrosion is prevented and thus simple and easy changing of the wheel is enabled. The same also applies to other bearing components which are in contact with other metal surfaces of mounting parts so that sticking of the bearing component on a mounting part is prevented by the surface coating.

The term surface coating refers to a layer system with at least one layer. In particular, several layers can also be formed at least partially on top of one another and/or next to one another.

The surface coating may have a layer thickness of at least 10 µm. The surface coating may have a layer thickness of at most 20 µm. According to the salt spray fog test from DIN EN ISO 9227, for evaluation of a corrosion protection action, among other things, of metallic covers, the surface coating formed as a zinc flake coating, in the case of a layer thickness of 10 µm, has corrosion protection against red rust of up to 720 hours and as a result satisfies the high safety requirements of wheel hubs in wheel bearings. The surface coating additionally reduces the influence of corrosive media such as oxygen or electrolytes and increases the period of protection of the component.

In particular, the wheel bearing arrangement is used in a vehicle. A motor vehicle is to be understood as a vehicle which according to its design and its particular equipment fixedly connected to the vehicle for conveying people or goods. For example, a motor vehicle is to be understood as a car or a heavy goods vehicle.

According to a method for coating a wheel bearing arrangement, at least one component surface to be coated of the wheel bearing arrangement is cleaned by means of a fluid cleaning medium, wherein the cleaning medium is at least partially subsequently removed from the at least one component surface, wherein, in a further method step, the at least one component surface is coated with a coating medium for generating a surface coating formed as a zinc flake coating, and wherein the surface coating is finally cured at a curing temperature of at least 15° C.

The cleaning medium is to be understood as a type of detergent with which the surface of the wheel bearing arrangement can be cleaned at least partially of process media such as dust, residues which contain oil or grease, chips, stains and/or silicon. As a result of the method, the process media to be removed can be fully removed from the wheel bearing arrangement. It is, however, possible that small residues of process media can be left behind on the surface of the wheel bearing arrangement without reducing the quality of the surface coating to be generated in a subsequent method step.

The cleaning medium may be a cleaning medium which contains solvent. Cleaning media which contain solvent are characterized by rapid action, good material compatibility and ease of use. The cleaning medium thus does not react with the surfaces to be treated, i.e. the material of the wheel bearing arrangement. The cleaning medium is preferably sprayed onto the component surfaces to be treated, wherein a manual application of the cleaning medium on the wheel bearing arrangement is also conceivable. In other words, the cleaning of the component surfaces to be coated is performed in a wet-chemical process. In particular, pre-treatment of the wheel bearing arrangement takes place. This is particularly advantageous for a targeted application of the cleaning medium at the desired points of the component. After application of the cleaning medium on the component surfaces to be treated, the wheel bearing arrangement is centrifuged with a high rotational speed so that excess cleaning medium is removed from the component surfaces as a result of the centrifugal force which arises. In particular, the entire cleaning medium is removed from the wheel bearing arrangement, but process-induced residues on the component surfaces are possible so that slightly moist component surfaces can be present after the removal of the excess cleaning medium.

The coating of the at least one component surface may be carried out by means of a spraying process. The coating medium is applied, for example, by means of a spraying device manually or fully automatically onto the component surface, to be coated, of the wheel bearing arrangement. Alternatively, the wheel bearing arrangement can also, depending on the component requirements, be at least partially immersed in the coating medium, wherein the coating medium wets the component surfaces to be coated for generating the surface coating. This is particularly advantageous for mounting the wheel bearing arrangement since the surface coating can only be applied onto the component surfaces after complete mounting of the wheel bearing. Damage to the surface coating during the mounting process of the wheel bearing arrangement is thus avoided.

After the coating step, the curing of the surface coating is performed at least at room temperature. According to one embodiment, the curing of the surface coating is performed at a curing temperature of at most 80° C. The coating medium reacts in this case with air humidity and the component surface of the wheel bearing arrangement and forms the surface coating. The coating medium can additionally react with the process-induced moist residues of the cleaning medium on the component surfaces for the formation of the surface coating. The low process temperature during the method is advantageous.

The curing of the surface coating is performed over a curing period of at least 10 minutes. In particular, the quality of the surface coating increases with the duration of curing.

BRIEF DESCRIPTION OF THE DRAWINGS

Further measures are explained in greater detail below together with the description of an exemplary embodiment on the basis of the figures, wherein the same or similar elements are provided with the same reference numbers. In the figures.

DETAILED DESCRIPTION

Figure 1:
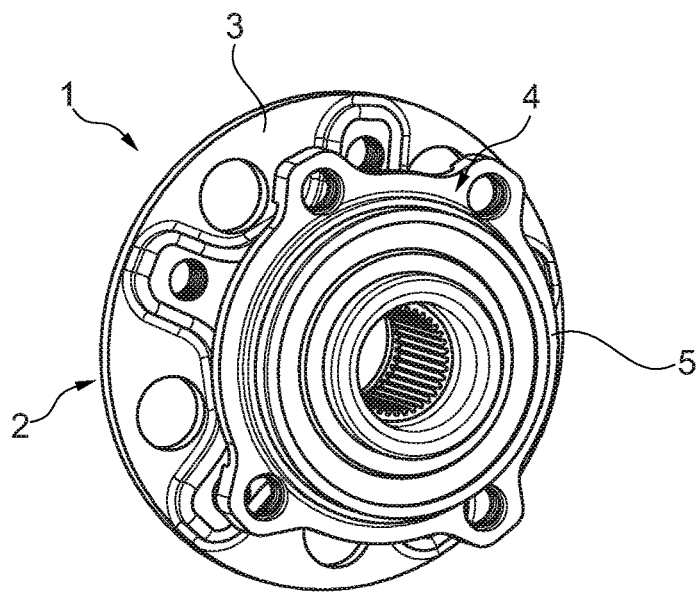
FIG. 1 shows a schematic perspective representation of a wheel bearing arrangement.

According to FIG. 1, a wheel bearing arrangement 1 has a wheel hub 2 of a motor vehicle, not represented here. Wheel hub 2 has, at one axial end, a wheel flange 3 for fastening a wheel rim, not represented, and a brake disk. An outer ring 5 of wheel bearing arrangement 1 is mounted rotatably on wheel hub 2 by means of an anti-friction bearing 4.

Figure 2:
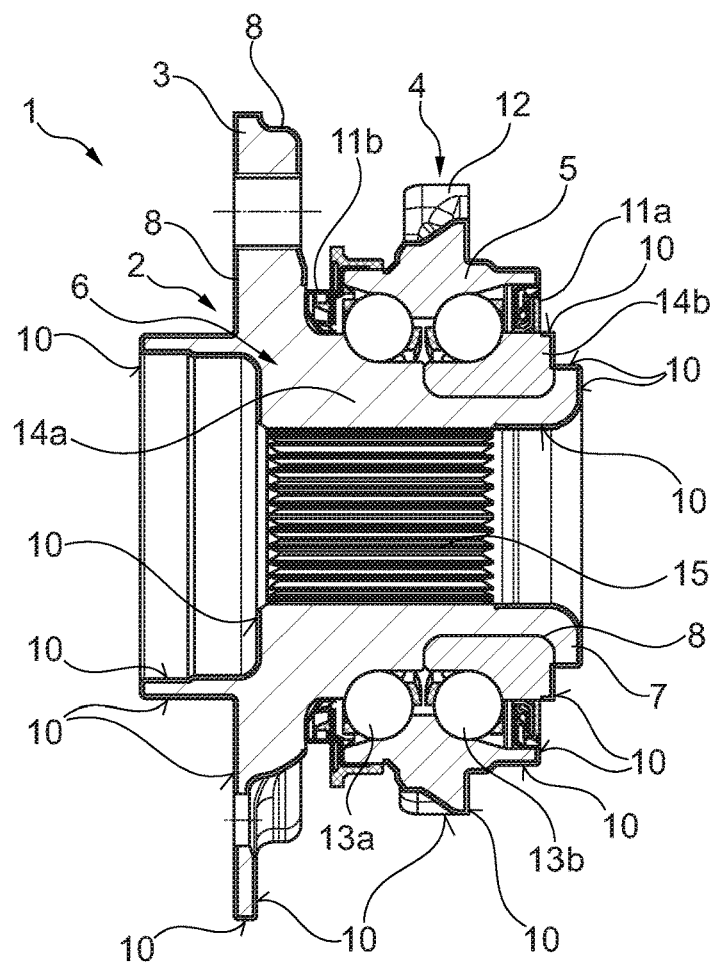
FIG. 2 shows a schematic sectional representation of the wheel bearing arrangement according to FIG. 1.

According to FIG. 2, wheel bearing arrangement 1 is represented after a curing process. A two-row anti-friction bearing 4 in the form of an angular ball bearing is arranged in an O-arrangement on wheel hub 2, which anti-friction bearing 4 is sealed off by two seals 11a, 11b from moisture and dirt. Anti-friction bearing 4 has an outer ring 5, on which a fastening flange 12 is formed, as well as an inner ring 6. Bearing balls 13a, 13b which serve as rolling bodies are arranged between outer ring 5 and inner ring 6. Inner ring 6 comprises two bearing inner rings 14a, 14b, wherein axially outer bearing inner ring 14a is formed in one piece on wheel hub 2, while axially inner bearing inner ring 14b is a separate component which is pushed onto wheel hub 2. Wheel hub 2 has a collar 7 which is formed orbitally, extends substantially radially and serves as an axial stop for separate bearing inner ring 14b.

Figure 3:
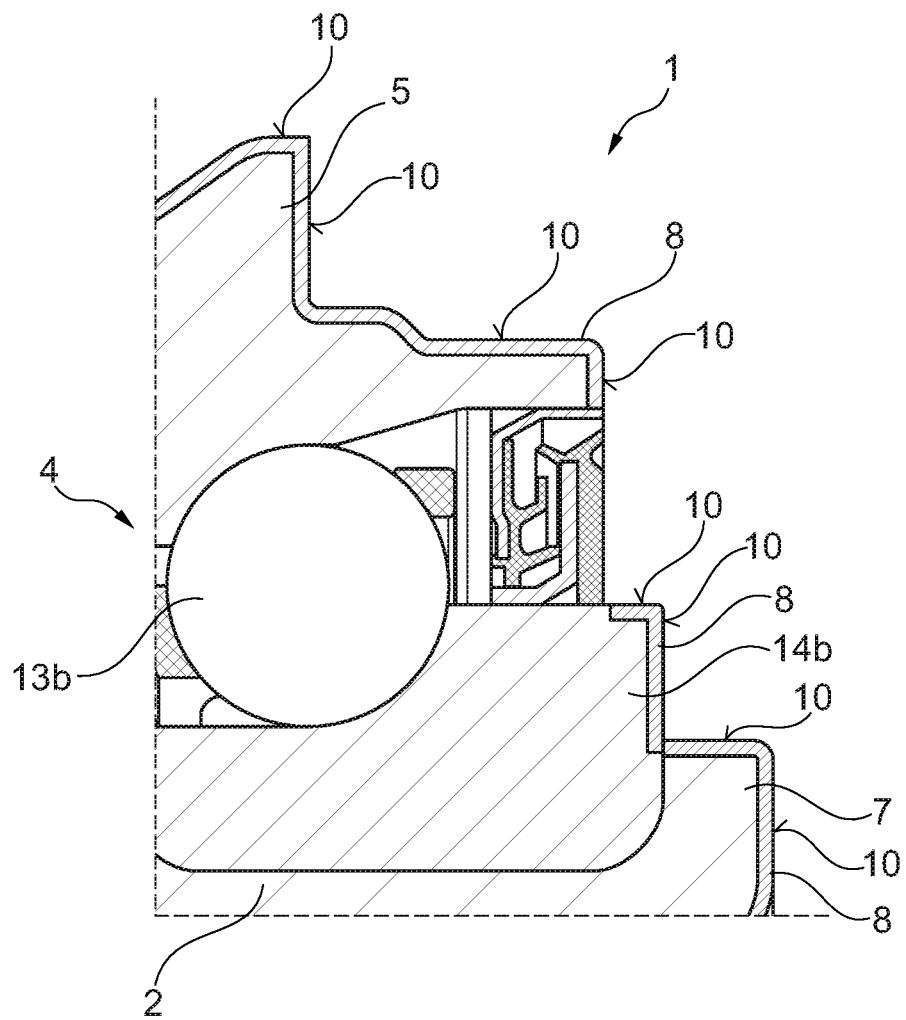
FIG. 3 shows a schematic detailed sectional representation of the wheel bearing arrangement according to FIG. 2.

According to FIGS. 2 and 3, a surface coating 8 for improving corrosion protection is formed partially on outer component surfaces 10 of wheel bearing arrangement 1 by means of a method for coating wheel bearing arrangement 1, wherein surface coating 8 is formed as a zinc flake coating partially on wheel hub 2, on outer ring 5 and on inner bearing inner ring 14b. Surface coating 8 is thus formed on all visible, outer, metallic component surfaces of wheel bearing arrangement 1. This is apparent in particular from the detailed sectional representation in FIG. 3. An inner toothing geometry 15 of wheel hub 2 has no surface coating 8. Surface coating 8 is formed in each case circumferentially around wheel bearing arrangement 1 and has a layer thickness of at least 10 μm and at most 20 μm.

LIST OF REFERENCE NUMBERS

1 Wheel bearing arrangement
2 Wheel hub
3 Wheel flange
4 Anti-friction bearing
5 Outer ring
6 Inner ring
7 Collar
8 Surface coating
9 Rolling body
10 Component surface
11a, 11b Seal 12 Fastening flange
13a, 13b Bearing ball
14a, 14b Bearing inner ring
15 Toothing geometry

The invention claimed is:

1. A wheel bearing arrangement for a motor vehicle, comprising a wheel hub, wherein the wheel hub is connected to a wheel flange, wherein a multi-row anti-friction bearing having an outer ring and an inner ring is arranged on the wheel hub, wherein the inner ring comprises two bearing inner rings, wherein an axially outer bearing inner ring is formed in one piece on the wheel hub and wherein an axially inner bearing inner ring is a separate component which is mounted on the wheel hub and is axially pretensioned by a collar, that acts on an end surface of the inner bearing inner ring, of the wheel hub, wherein at least partially a surface coating for improving corrosion protection is formed on the wheel bearing arrangement, wherein the surface coating is formed as a zinc flake coating, wherein a coating medium used to form the surface coating comprises zinc powder, aluminum powder, titanium tetrabutanolate and further constituents, wherein the surface coating has a layer thickness of at least 10 μm.

2. The wheel bearing arrangement as claimed in claim 1, wherein the surface coating has a layer thickness of at most 20 μm.

3. A method for coating a wheel bearing arrangement as claimed in claim 1, wherein the method comprises the following method steps:
   cleaning at least one component surface to be coated of the wheel bearing arrangement by means of a fluid cleaning medium;
   at least partial removal of the cleaning medium from the at least one component surface;
   coating the at least one component surface with a coating medium for generating a surface coating formed as a zinc flake coating, wherein the coating medium used to form the surface coating comprises zinc powder, aluminum powder, and titanium tetrabutanolate; and
   curing the surface coating at a curing temperature of at least 15° C. and at most 80° C.

4. The method as claimed in claim 3, wherein the coating of the at least one component surface is performed by means of a spraying process.

5. The method as claimed in claim 3, wherein the cleaning medium contains solvent.

6. The method as claimed in claim 3, wherein the curing of the surface coating is performed over a curing period of at least 10 minutes.

7. A motor vehicle, comprising a wheel bearing arrangement as claimed in claim 1.

* * * * *